United States Patent Office 3,286,098
Patented Nov. 15, 1966

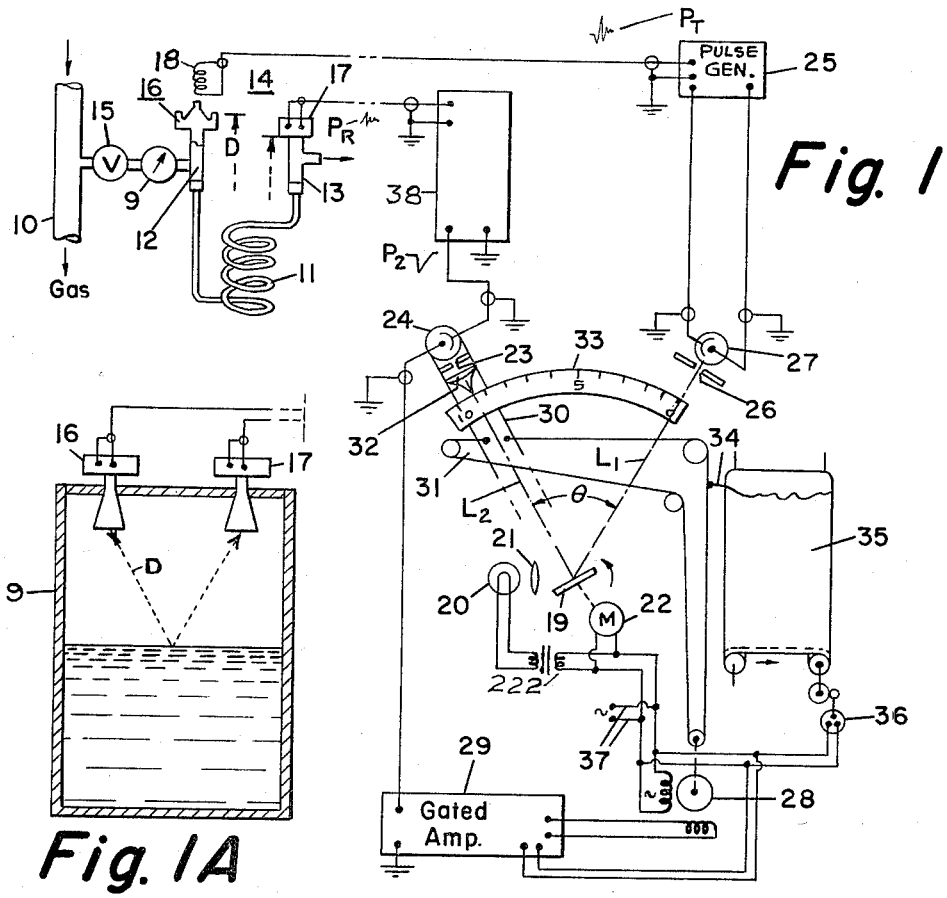
Fig. 1
Fig. 1A
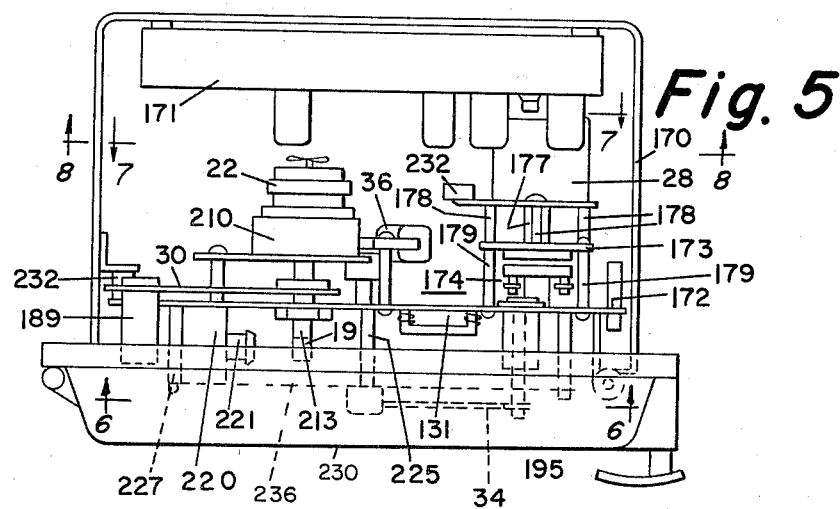
Fig. 5

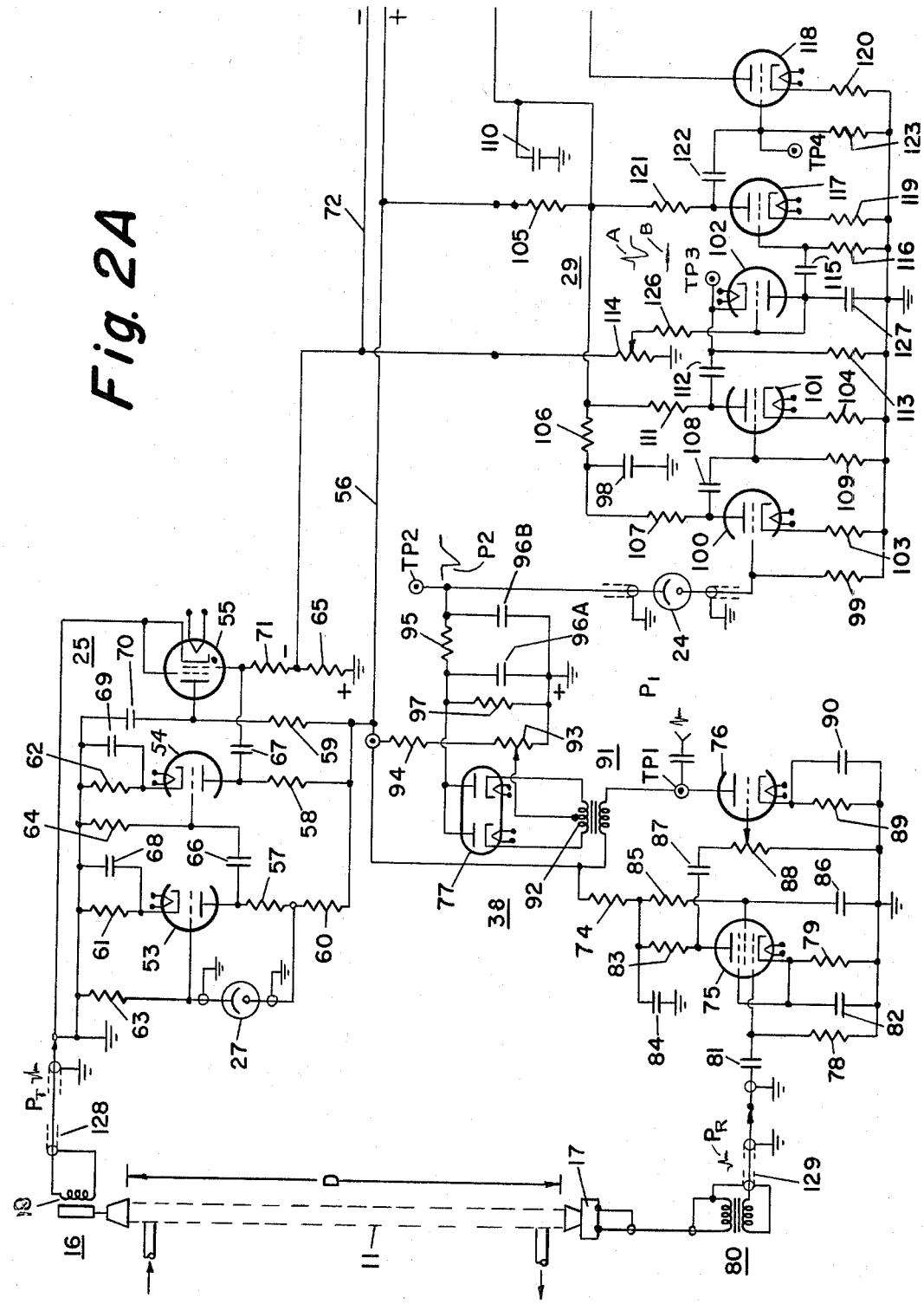

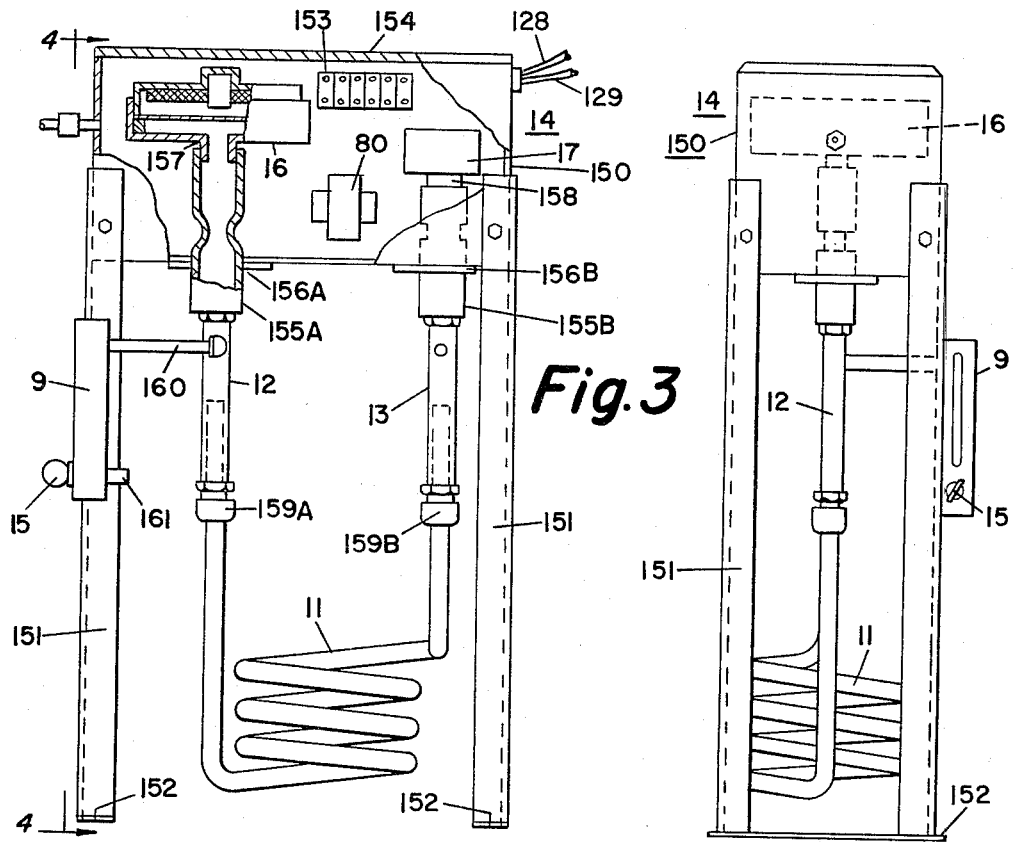
Fig. 3
Fig. 4
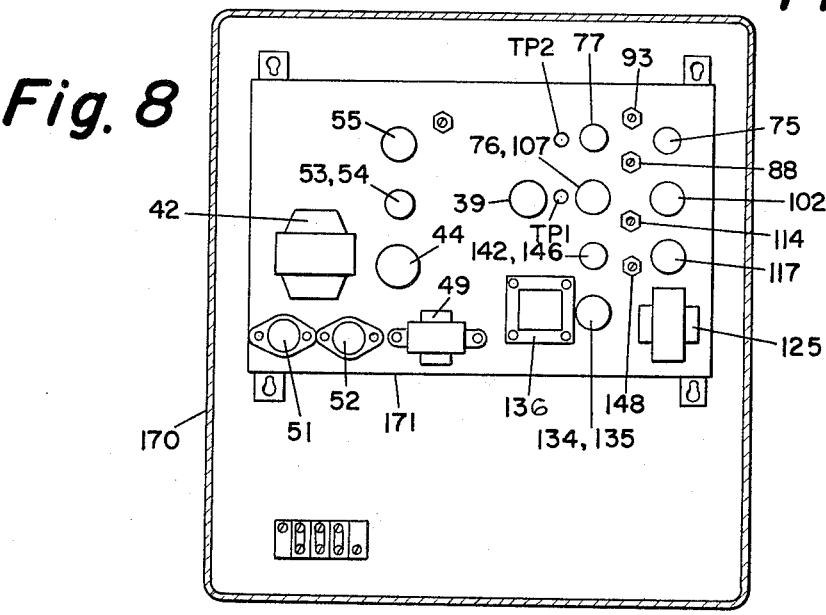
Fig. 8

3,286,098
METHODS AND APPARATUS FOR DETERMINING FACTORS RELATED TO SONIC VELOCITY IN A GAS
Bernard C. Long, Woodbury, and Olin S. Centofanti, Woodbury Heights, N.J., assignors to Mobil Oil Corporation, a corporation of New York
Filed Feb. 28, 1963, Ser. No. 261,668
10 Claims. (Cl. 250—230)

This invention relates to systems for producing an accurate and variable standard interval of lapsed time for comparison with the time interval between two electrical pulses respectively produced for example at the times of application and detection of a sonic pulse at spaced points of a gas path.

In accordance with the present invention, the time interval required for a rotating beam of light to traverse the angular distance between two light-sensitive devices is automatically variable, as by an electric motor, to match the time interval required for a sonic pulse to traverse a gas path from a point of application of the pulse to a point at which it is detected. The angle at which matching exists may be used in determination of the molecular weight or related characteristic of a gas of known constituents when the length of the gas path is known or precalibrated and may be used for determination of liquid level or other factor related to distance when the gas is of known sonic transmission characteristics.

More particularly in accordance with the present invention, two photocells, or equivalent, one fixed and the other automatically adjustable, are angularly spaced about the axis of rotation of a light beam having constant angular velocity. As a first of the photocells, specifically the fixed one, is scanned by the light beam, the resulting electrical pulse is converted to a sonic pulse applied to one point or region of a gas path. The sonic pulse as detected at another point or region of the gas path is converted to an electrical signal pulse which is utilized together with scanning of the second photocell to control a reversible motor effective to change the angle between the photocells to match the time interval for which they are scanned in succession to the time interval required for travel of the sonic pulse between the points of its application and detection in the gas path.

More specifically, for one sense of mismatch of said time intervals, the signal pulses derived from detection of the sonic pulses provide control pulses when the second photocell is scanned. Such pulses so affect bias circuits for the motor that it is energized to run in proper direction to reduce the mismatch. If on the other hand the mismatch of the time intervals is in opposite sense, the signal pulses derived from detection of the sonic pulses provide no control pulses when the second photocell is scanned and the bias circuits for the motor provide for its energization to run in opposite direction. In either case, when the movable photocell is adjusted to the position for which the light-beam angle matches the sonic-pulse travel time, the control pulses establish balance in the motor bias circuits so that its net torque is essentially zero.

The invention further resides in systems and apparatus having features of novelty and utility hereinafter described and claimed.

For a more detailed understanding of the invention, reference is made to the accompanying description and to the attached drawings in which:

FIG. 1 is a block diagram of the basic system as used with a sonic driver and pickup arrangement for determining the molecular weight or related physical characteristic of a gas;

FIG. 1A illustrates a sonic driver and detector arrangement for adapting the system of FIG. 1 to liquid level or similar distance measurements;

Figure 2B:
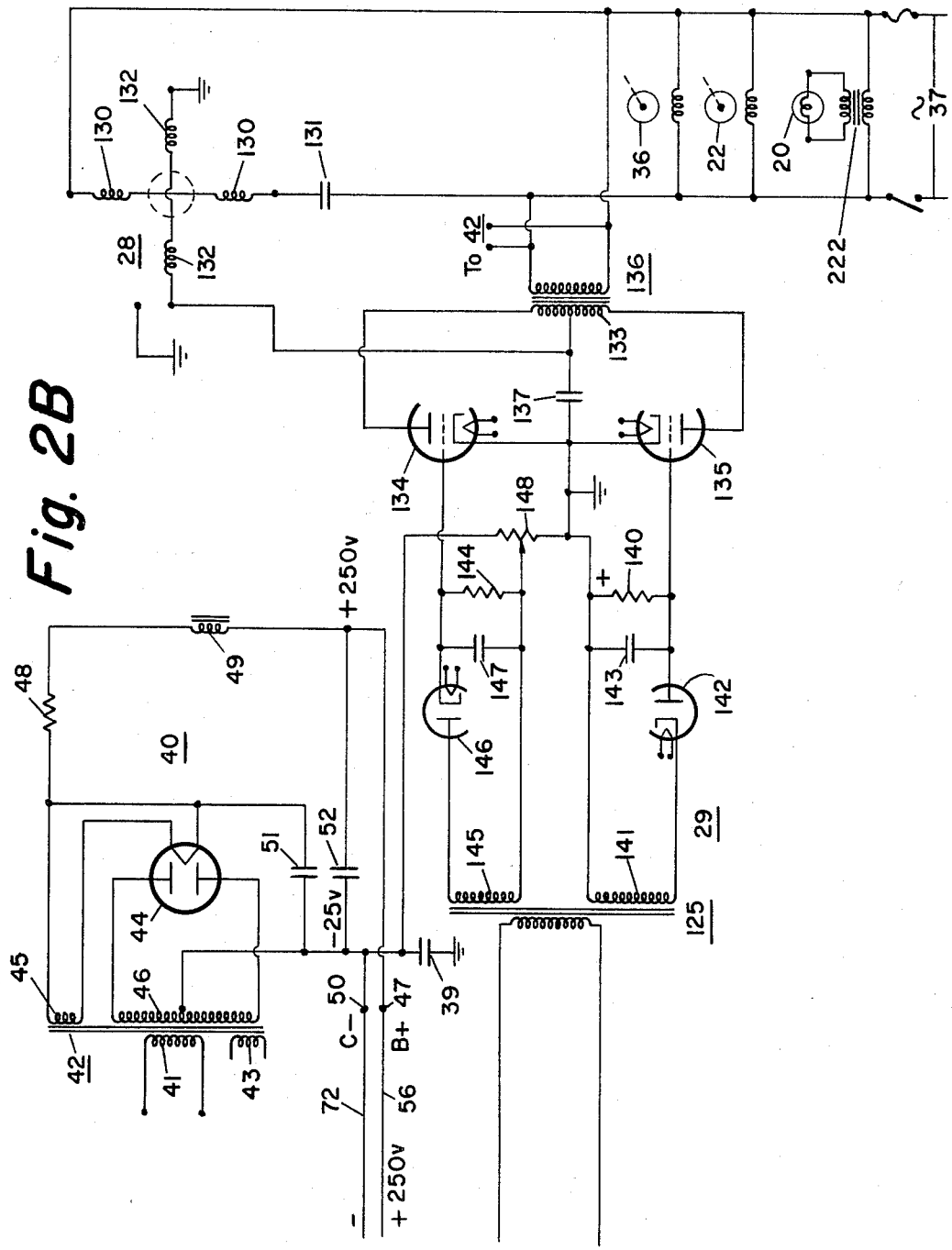
Figure 6:
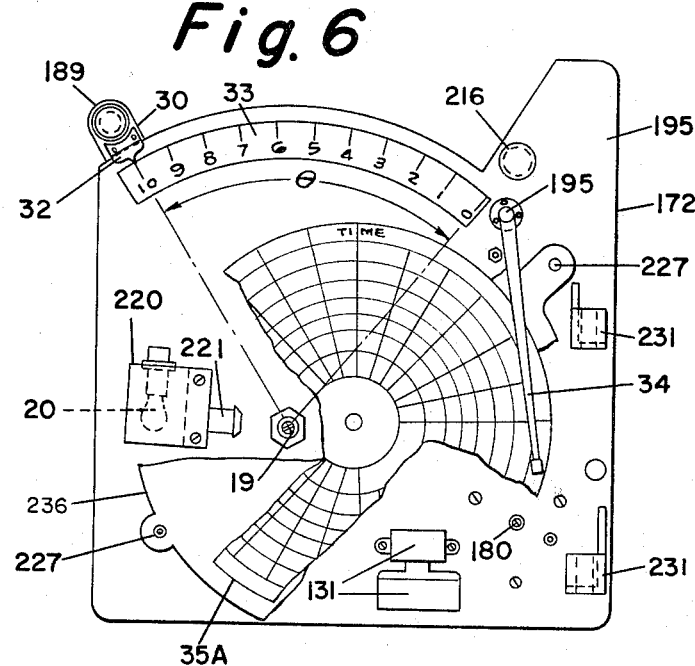
Figure 7:
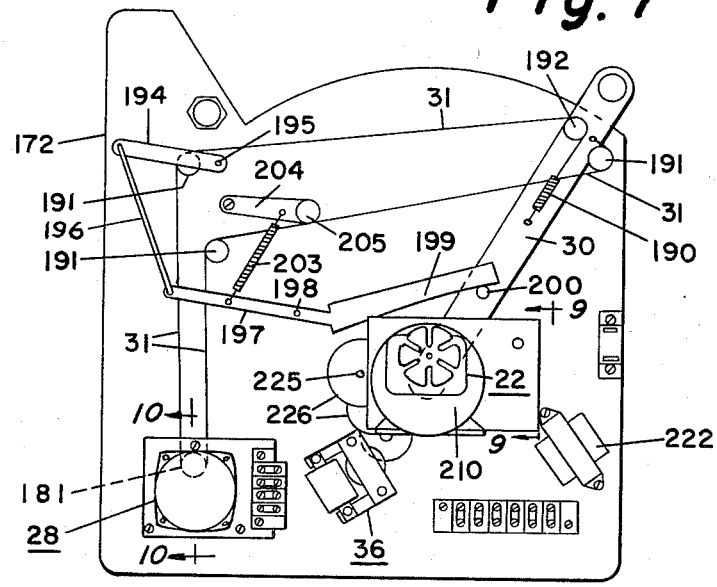
Figure 9:
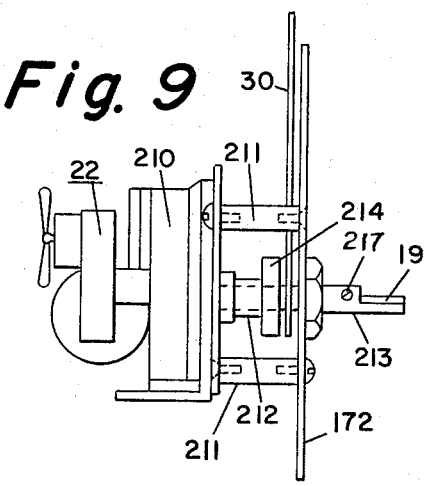
Figure 10:
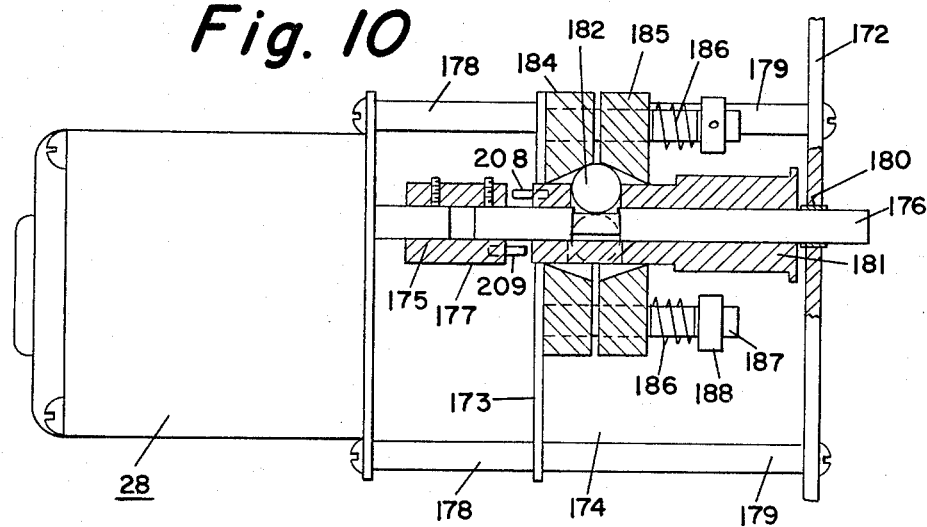
Figure 11:
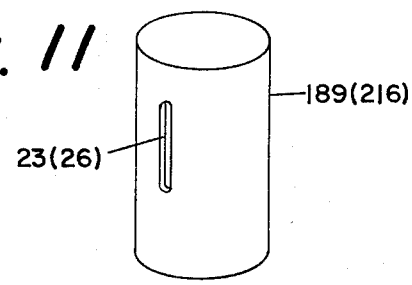

FIGS. 2A and 2B jointly comprise a schematic circuit diagram of electrical component suited for the basic system of FIG. 1;

FIG. 3 is a front elevational view in part broken away and sectionalized of a gas column device suited for the system of FIG. 1;

FIG. 4 is an end elevational view of the device of FIG. 3 as viewed from line 4—4 thereof;

FIG. 5 is a top plan view, with its housing in part broken away, of an indicator-recorder unit suited for the system of FIG. 1;

FIG. 6 is a front elevational view taken on line 6—6 of FIG. 5;

FIG. 7 is a rear elevational view taken on line 7—7 of FIG. 5;

FIG. 8 is a front elevational view taken on line 8—8 of FIG. 5;

FIG. 9, on enlarged scale, is an end elevational view taken on line 9—9 of FIG. 7;

FIG. 10, on enlarged scale, is an end elevational view taken on line 10—10 of FIG. 7; and FIG. 11 is a perspective view of one of the photocell housings of FIGS. 5 and 6.

To assist in understanding how the system later herein specifically described utilizes the transmission of sonic pulses in a gas to measure the molecular weight or related physical character of the gas, distance, liquid level or other related variables, there is first briefly discussed the relationships involved. The velocity of sound in an ideal or pure gas may be expressed as (1)
$$V=\sqrt{\frac{gKRT}{M}}$$

where:

$V$ = Velocity of sound in the gas (ft./sec.)
$g$ = Acceleration due to gravity (32.17 ft./sec.²)
$K = \frac{C_p}{C_v}$ (ratio of specific heats of the gas at constant pressure and constant volume)
$T$ = Absolute temperature ° Rankin
$M$ = Molecular weight
$R$ = Gas constant (1546)

Denoting the length of the sound path in the gas as "D" and the time interval required for the sound pulse to traverse this path as "$t$," Equation 1 may be rewritten as (2)
$$D=t\sqrt{\frac{gKRT}{M}}$$

For a given gas at a given temperature, the value of $$\frac{gKRT}{M}$$

is constant, so that an unknown distance D can be determined by measurement of the time interval $t$ required for a sonic pulse to traverse such distance, i.e., for measurement of distance there is utilized the equation: i.e., (3) $\qquad D=Ct$ where $C$ = instrument constant. The associated indicator or recorder scale is linear with respect to the variable D.

For measurement of the molecular weight of a gas with distance D and the temperature T known, there is utilized the equation (4)
$$M=\frac{t^2}{D^2}(gKRT)$$

The term K (for the system of units identified in Equation 1 has a value of 1.66 for mono-atomic gases and approaches 1.0 for complex gas molecules such as hydrocarbons. For a given gas mixture, a change in value of K is correlated to a change in molecular weight so that the instrument can be calibrated to read directly in terms of molecular weight. Since the heating value of hydrocarbon gas is directly related to its molecular weight, the instrument scale may be calibrated to read directly in terms of heat units per unit volume (B.t.u./cu. ft.).

Referring now to FIG. 1 as exemplary of the preferred basic system as used for performing our new method of determining the molecular weight of a gas, a continuous sample of the gas flowing through pipe 10 is diverted to flow as a side stream through a confined path afforded by the tube 11 and the associated fittings 12, 13 of the device or unit 14. The rate of flow of the gas may be controlled by valve 15 and measured by flow meter 9. One of the fittings, for example, the inlet fitting 12, is mechanically coupled to the sonic driver unit 16 which may be a small modified loud speaker. The other of the fittings, specifically the fitting 13, is mechanically connected to the sonic detector unit 17 which may be a modified microphone unit of any suitable type. Between the diaphragms of the units 16 and 17, there is thus confined a gas column whose effective length provides the term D of Equation 4.

The driver coil 18 of unit 16 is periodically energized by electrical pulses $P_T$ to produce sonic pulses which travel along the confined gas at a velocity which is a function of the mean molecular weight of the gas. The arrival of each of the sonic pulses at the opposite end of the column is detected by the unit 17 and converted to electrical pulses $P_R$.

Using Equation 4, the molecular weight M of the gas can be measured by determining the time (t) required for the sonic pulses to pass from one end to the other of the gas column. To that end, the system of FIG. 1 compares or matches the time of travel of the sonic pulses through the gas column with the angle $\theta$ through which a light beam L, revolving at known angular velocity, travels from scanning of photocell 27 to scanning of photocell 24. The repeated scanning of the first photocell 27 provides the electrical pulses $P_T$ for application of sonic pulses to the gas column by the driver unit 16 and the angle $\theta$ is automatically adjusted so that the corresponding scanning of the second photocell 24 is made to be coincident with the detection of such sonic pulses by the detector unit 17.

Specifically, the mirror 19 in the path of a beam of light produced by a light source, exemplified by lamp 20 and lens 21, is rotated by the constant speed motor 22 in the direction indicated by the arrow. Each time the beam sweeps across the aperture 26 associated with the photocell 27, or equivalent, the amplifier 25 generates an exciting pulse $P_T$ for the sonic driver unit 16. Later in each of its revolutions, the beam sweeps across the aperture 23 associated with the photocell 24. When this scan is coincident with the detection by the pickup unit 17 of arrival of a sonic pulse at the other end of the gas column, the angle $\theta$ traversed by the beam from aperture 23 to aperture 26 is a measure of the mean molecular weight of the gas. If such coincidence does not exist, the reversible motor 28 is controlled, as later specifically described, by the output of the amplifier 29, whose input circuit includes phototube 24 and the output of amplifier 38 to vary the angle $\theta$ until such coincidence obtains.

More particularly, one of the photocells, specifically photocell 24, is carried by an arm 30 which is free to pivot about the axis of mirror 19 independently of the mirror shaft. The arm 30 is mechanically coupled, as by cord 31, to the output shaft of motor 28. The pointer or index 32, also carried by arm 30, cooperates with the scale 33 suitably calibrated in units of molecular weight or related variable of the gas. To record variations of the gas characteristic, the pivoted arm 30 may also be connected, as through cord 31, to the recorder pen or stylus 34. An associated recorder chart 35, shown in FIG. 1 as a strip chart, is driven by the constant speed motor 36 with respect to the path of travel of the stylus 34.

The method and system above described may be used to determine the mean molecular weight of gas mixtures having known constituent in unknown ratios: for a two-element gas composition, the chart and recorder scales may be calibrated in terms of percent concentration of either or both gases: in the case of hydrocarbon gases, the scales may be calibrated in B.t.u.'s per unit volume or other thermal value units for monitoring of fuel gas being fed by pipe 10 to an engine, boiler or other utilization devices.

The basic system of FIG. 1 may be adapted for distance measurements. For example, it may be used for determination of liquid level by mounting the sonic driver unit 16 and the sonic pulse detector 17 above the level of liquid in a tank 9 (FIG. 1A). In such case, the length of the gas path or distance D varies as a function of the liquid level. With the other factors being known, Equation 2 is solved when the time-sweep angle $\theta$ matches the time-interval for the sonic pulse to travel the distance D. For a given installation, the scale 33 may be calibrated to read directly in terms of liquid depth H, gallons or other units.

Referring now to FIG. 2A, the pulse generator 25 of FIG. 1 may comprise a two-stage amplifier for amplifying the output of photocell 27 and applying it to the grid circuit of a gas discharge tube or thyratron 55 whose cathode circuit includes the exciting coil 18 of the sonic drive unit 16. All the D.C. operating voltages for the tubes of the pulse generator, as well as of the amplifiers 29 and 38, are derived from the power supply 40 (FIG. 2B) which is briefly described before reversion to further discussion of the pulse generator.

The primary winding 41 of the power transformer 42 is excited from the power line 37. The low voltage secondary winding 43 supplies the cathode heating current for all tubes of the system except the high voltage rectifier 44 whose directly heated cathode is supplied by the other low voltage secondary winding 45. The end terminals of the high voltage secondary winding 46 of transformer 42 are connected to the anodes of the full-wave rectifier tube 44. The cathode of the tube 44 is connected to the B+ output terminal 47 of the power supply 40, via the resistor 48 and choke coil 49, and to the C− output terminal 50 by the input filter capacitor 51. The output filter capacitor 52 is connected between the B+ and C− output terminals 47, 50 of the power supply. The mid tap of the high voltage secondary 46 is connected to the C− output terminal 50 of the power supply. The filter capacitor 39 is connected between terminal 50 and ground.

Reverting now to discussion of pulse generator or amplifier 25 (FIG. 2A), the anodes of the two amplifier triodes 53, 54 and the thyratron 55 are respectively connected to the B+ lead 56 from output terminal 47 of the power supply through the resistors 57 and 60, 58 and 59. The anode of phototube 27 is connected to the B+ lead 56 through resistor 60 which is in series with the anode resistor 57 of tube 53. The two triodes 53, 54 are self-biased by the resistors 61, 62 connected from their cathodes to ground. The voltage drop across these resistors is respectively applied as a negative-bias, via resistors 63 and 64, to the grids of the triodes 53, 54. The control grid of the thyratron tube 55 is connected to ground via resistors 71 and 65. The common terminal of these resistors is connected to the C− lead 72 from the power supply 40. Under zero input signal conditions of amplifier 25, the negative bias applied to the grid of thyratron tube 55 is sufficient to block flow of anode current through the exciting coil 18 of the sonic driver unit 16.

The cathode of the phototube 27 is connected to ground via the grid resistor 63 of the first amplifier triode. When the phototube 27 is swept by the light beam, the resulting anode current pulse as traversing the grid resistor 63 of triode 53 swings the grid in positive direction. The resulting negative pulse appearing at the anode of triode 53 is applied to the grid of triode 54 through coupling capacitor 66. The resulting positive pulse appearing at the anode of tube 54 is applied through coupling capacitor 67 to the grid of thyratron 55 and causes that tube to fire so to provide a discharge path for capacitor 70. The resulting heavy anode current of tube 55 as traversing coil 18 of the driver unit 16 affects application of a sonic pulse to the gas column. Because of the speed at which the foregoing events occur, the application of the sonic pulse to the gas column is to all intents and purposes concurrent with the sweeping of the photocell 27 by the light beam.

During discharge of capacitor 70, the anode voltage of tube 55 falls below the ionizing potential of the gas in the tube so that a non-conductive state thereof is reestablished. Before the photocell 27 is next scanned, the capacitor 70 is recharged by current supplied through the anode circuit resistor 59.

The capacitors 68, 69 respectively in shunt to the cathode resistors 61, 62 of the amplifier triodes 53, 54 serve as bypass capacitors. The capacitor 70 connected between the anode of the thyratron 55 and ground is for the purpose of storing a given quantity of electrical energy which is released upon ionization of tube 55 to provide an energizing pulse $P_T$ for the sonic driver unit 16. The resistor 71 connected between the negative terminal of resistor 65 and the control grid of thyratron 55 is of relatively high value and serves as the major portion of the input coupling resistance for that tube.

Still referring to FIG. 2A, the amplifier 38 for amplifying the detected pulse output of microphone 17 includes pentode 75 in the first amplifier stage, triode 76 in the second amplifier stage and output signal rectifier 77. The #1 or control grid of tube 75 is connected to ground through input resistor 78 and derives its bias from the cathode resistor 79 which is shunted by bypass capacitor 82. The pulse signal as detected by microphone 17 is applied to the control grid of tube 75 through the step-up signal transformer 80 and the coupling capacitor 81. The output or load resistor 83 of the first stage is connected between the anode of tube 75 and a decoupling circuit comprising bypass capacitor 84 and resistor 74. The anode current for tube 75 is supplied from the B+ lead 56 through the decoupling resistor 74 and the load resistor 83. The screen grid current for tube 75 is supplied from B+ lead 56 through decoupling resistor 74 and the screen-dropping resistor 85. The screen is bypassed to ground by capacitor 86.

The amplified pulse signal appearing at the anode of tube 75 is applied through coupling capacitor 87 to the ungrounded terminal of potentiometer 88 in the grid circuit of triode 76. The grid bias for triode 76 is derived from the cathode resistor 89 which is shunted by the bypass capacitor 90. The anode of triode 76 is connected to the B+ supply lead 56 through the primary winding of the interstage signal transformer 91.

The end terminals of the step-down secondary winding 92 of transformer 91 are connected to the cathodes of the full-wave rectifier 77. The center tap of winding 92 is connected to the adjustable contact of potentiometer 93 which together with resistor 94 forms a potential-divider between ground and the B+ supply lead 56. The cathodes of rectifier tube 77 are thus positively biased with respect to ground. The anodes of rectifier tube 77 are connected to the cathode of the photocell 24 through the resistor 95. This resistor together with resistor 97 and capacitors 96A, 96B forms a $\pi$ section for shaping the output of the pulse signal rectifier 77. The cathode bias of rectifier 77 is manually set by adjustment of potentiometer 93 so that there is no rectification of any noise signal present in the output of tube 76.

The output pulse $P_2$ of amplifier 38 is applied to the photocell 24 in series with the input resistor 99 of amplifier 29. However, no input voltage appears across the resistor 99 except when the photocell 24 is rendered conductive by the sweeping light beam. Also no voltage will appear across resistor 99 even when the photocell 24 is swept by the beam unless at that time the network 95, 96 is in charged state. When both of the aforesaid conditions concurrently exist, the pulse signal appearing across the input resistor 99 is amplified by the triodes 100, 101, and their amplified pulse output is rectified by the diode-connected triode 102.

The triodes 100, 101 are self-biased respectively by the cathode resistors 103, 104. The anode current for triode 100 is derived from the B+ supply lead 56 through decoupling resistor 105, decoupling resistor 106 and load resistor 107. The bypass capacitor 98 is connected to ground from the junction of the resistors 106, 107 and bypass capacitor 110 is connected to ground from the junction of resistors 105, 106. The amplified pulse signal appearing at the anode of triode 100 is applied to the grid of triode 101 by the network including coupling capacitor 108 and grid resistor 109.

The anode current for triode 101 is supplied through decoupling resistor 105 and load resistor 111. The amplified pulse signal appearing at the anode of triode 101 is applied to the cathode of rectifier 102 by the network including coupling capacitor 112 and resistor 113. The directly-connected anode and grid of triode 102 are biased negative with respect to ground by connection to the adjustable contact of potentiometer 114 which is connected between ground and the C— lead 72 from the power supply. This bias is manually adjusted or set to eliminate rectification of any unwanted signal, such as that due to residual charge and capacitance effects, in the output of tube 101. The rectified pulse signals appearing at the anode of rectifier 102 are applied by the coupling network including capacitor 115 and grid resistor 116 to the first of two amplifier triodes 117, 118. The small capacitor 127 connected from the anode of rectifier 102 to ground in conjunction with resistor 126 is for the purpose of shaping the signal wave or pulse supplied through coupling capacitor 115 to the grid of tube 117. The triodes 117, 118 are respectively self-biased by the cathode resistors 119, 120. The anode current of the first triode 117 is supplied from the B+ line 56 through resistor 105 and load resistor 121. The signal appearing at the anode of triode 117 is applied to the grid of the second triode 118 by the coupling network including capacitor 122 and grid resistor 123. The anode circuit of triode 118 includes the primary winding of the output signal transformer 125 (FIG. 2B) of amplifier 29.

The pulse signals so supplied to the output transformer 125 are utilized as now described to control the direction of rotation of the reversible motor 28 so that, as described in connection with FIG. 1, the angle $\theta$ between the photocells 24, 27 is a measure of the molecular weight of the gas being monitored or tested and varies that angle in accordance with the molecular-weight changes.

Winding 130 of motor 28 is continuously energized from the A.C. line 37 through phasing capacitor 131.

The other winding 132 of the motor is connected between ground and the center tap of the secondary winding 133 of power transformer 136 whose primary winding is also continuously energized from the A.C. power line 37. The end terminals of the secondary winding 133 are respectively connected to the anodes of triodes 134, 135, which are used as grid-controlled rectifiers so that the anodes are alternately of positive potential at the power-line frequency. The cathodes of triodes 134, 135 are grounded so that the motor winding 132 is common to the return path from the cathodes of both triodes to the center tap of secondary winding 133.

A variable negative bias for the grid of rectifier triode 135 is derived from the pulse output of amplifier tube 118. To that end, the grid resistor 140 of tube 135 is connected across the secondary winding 141 of signal transformer 125 in series with the diode 142. Resistor 140 is shunted by the integrating capacitor 143.

A variable positive bias for the grid of rectifier tube 134 is also derived from the output of amplifier tube 118. To that end, the grid resistor 144 of tube 134 is connected across the secondary winding 145 of signal transformer 125 in series with the reversely poled diode 146. Resistor 144 is shunted by the integrating capacitor 147. A fixed negative bias voltage for the grid of tube 134 is derived from manually-adjustable potentiometer 148 which is connected between ground and the C— terminal 50 of the power supply. This adjustably fixed negative bias is in series with and opposed to any positive bias derived from the detected output of amplifier tube 118. With no signal present from tube 118, the potentiometer 148 is adjusted so that motor 28 is energized to increase angle $\theta$ at full-motor speed or torque, i.e., tube 134 is biased to cut-off.

When the time interval required for the sonic pulse to traverse the gas path of length D is greater than the time required for the light beam to sweep the angle $\theta$, no signal appears in the output circuit of tube 118. In such case, the rectifier tube 134 is non-conductive because biased to cut-off by potentiometer 148 and the rectifier tube 135, having no bias, is conductive for successive halfwaves at power-line frequency. Consequently, the winding 132 of motor 128 is excited by current pulses in such phase quadrature relation to the A.C. excitation of its winding 130 that the motor runs in direction to increase the angle $\theta$ between the photocells 24, 27.

When, on the other hand, the travel time of the sonic pulse is less than that required for the light beam to sweep the angle $\theta$, a signal appears in the output circuit of tube 118. This signal causes diode 142 to bias the rectifier tube 135 toward cut-off and causes diode 146 to produce an overriding positive bias for tube 134 so that it becomes conductive. For this case, the current pulses supplied to winding 132 of motor 128 are of reversed quadrature relation so that the motor runs in opposite direction to decrease the angle $\theta$ between the photocells 24, 27.

When the travel time of the sonic pulse and the time for the light beam to swing through angle $\theta$ are equal, a point is reached when the output signal of tube 118, acting through diodes 142 and 146, produces equal conductive states of tubes 134, 135. In consequence, there is no net lead or lag of the current in motor winding 132 relative to the excitation of winding 130 and motor 28 is at rest with the arm 30 at the matching point for the then existing molecular weight of the gas.

The test points $TP_1$, $TP_2$, $TP_3$ and $TP_4$ (FIG. 2A) are provided for checking, by an oscilloscope, the proper amplitudes and waveforms of the signals appearing at those points for proper operation of the system. With the horizontal sweep frequency of the oscilloscope set to the repetition frequency of the sonic pulses and its vertical deflection input terminal connected to $TP_1$, the input potentiometer of triode 76 of amplifier 38 is so adjusted that the amplitude of the pulse output $P_1$ at test point $TP_1$ is approximately 5 volts. With horizontal sweep frequency of the oscilloscope set at the pulse repetition frequency and its vertical deflection terminal connected to $TP_2$, the output of tube 77 is viewed to check the presence of a signal and its waveform. Also, the potentiometer 93 providing the fixed bias for the rectifier tube 77 is so adjusted the waveform of the rectifier output $P_2$ at test point $TP_2$, as viewed on the oscilloscope, corresponds with that shown. With the horizontal sweep frequency of the oscilloscope set at the pulse repetition frequency and its vertical deflection terminal connection to $TP_3$, the waveforms for the "Above-Balance" signals (angle $\theta$ too large) and the "Below-Balance" signals (angle $\theta$ too small), as displayed on the oscilloscope screen, should respectively correspond with the pulse forms A and B shown in FIG. 2A at the test point.

With the horizontal sweep frequency of the oscilloscope set at the pulse repetition frequency and its vertical deflection terminal connected to test point $TP_4$, the potentiometer 114 is so set that the signal at that point as viewed on the oscilloscope is visible with angle $\theta$ too large (an Above-Balance signal at test point $TP_3$) and is not visible with angle $\theta$ too small (a Below-Balance signal at test point $TP_3$).

Suitable circuit values and components for the circuitry of FIGS. 2A, 2B are tabulated below:

TABLE A

Tubes

| Ref. char.: | Type |
|---|---|
| 24, 27 | 934 |
| 44 | 5Y3 |
| 53, 54 | 12AU7 |
| 55 | 502A |
| 75 | 6AU6 |
| 76, 107 | 12AU7 |
| 77 | 6AL5 |
| 101, 102 | 12AU7 |
| 117, 118 | 12AU7 |
| 134, 135 | 12BH7 |
| 142, 146 | 6AL5 |

Resistors

| Ref. char.: | Ohms |
|---|---|
| 48 | 1500 |
| 57 | 240K. |
| 58 | 100K. |
| 59 | 100K. |
| 60 | 47K. |
| 61 | 2.2K. |
| 62 | 2.2K. |
| 63 | 3 meg. |
| 64 | 1 meg. |
| 65 | 10K. |
| 71 | 100K. |
| 74 | 47K. |
| 78 | 1 meg. |
| 79 | 470 |
| 83 | 220K. |
| 85 | 1 meg. |
| 88 | 500K. |
| 89 | 2.2K. |
| 93 | 500 |
| 94 | 20K. |
| 95 | 47K. |
| 97 | 470K. |
| 99 | 470K. |
| 103 | 1K. |
| 104 | 1K. |
| 105 | 240K. |
| 106 | 47K. |
| 107 | 470K. |
| 109 | 100K. |
| 111 | 250K. |
| 113 | 470K. |
| 114 | 50K. |
| 116 | 470K. |
| 119 | 1K. |
| 120 | 1K. |
| 121 | 250K. |
| 123 | 2 meg. |
| 126 | 240K. |
| 140 | 1 meg. |
| 144 | 1 meg. |
| 148 | 1 K. |

Capacitors

| Ref. char.: | Mfd. |
|---|---|
| 39 | 50 |
| 51 | 32 |
| 52 | 24 |
| 66 | .005 |
| 67 | .01 |
| 68 | .01 |
| 69 | .01 |
| 70 | .05 |
| 81 | .001 |
| 82 | .1 |
| 84 | .1 |
| 86 | .01 |
| 87 | .001 |
| 90 | .1 |
| 96A | .0015 |
| 96B | .005 |
| 98 | .1 |
| 108 | .005 |
| 110 | 16 |
| 112 | .02 |
| 115 | .01 |
| 122 | .05 |
| 127 | .005 |
| 131 | 1.25 |
| 137 | 1.25 |
| 143 | .5 |
| 147 | .5 |

A suitable mounting arrangement for the gas column and its associated transducers 16, 17 is shown in FIGS. 3 and 4. The box 150 which provides a protective housing for the driver unit 16, the detector unit 17, the microphone transformer 80 and the connector block 153 is supported at its corners by the elongated angle iron legs 151 to provide a clear space for disposition of the gas column tubing 11. Each pair of legs is attached at its lower end to a mounting plate or base 152. The top of the housing 150 is provided with a cover 154 for access to the enclosed units and connection blocks. The bottom of the box is apertured to receive the pipes 155A, 155B having mounting collars 156A, 156B intermediate their ends.

The upper open end of the pipe 155A as extending into the housing snugly receives the open-ended extension 157 of the case of the driver unit 16 and the upper open end of pipe 155B as extending within the housing similarly receives the open-ended extension 158 of the case of the detector unit 17. At their lower ends, the pipes 155A, 155B are respectively attached, removably or permanently, to the upper ends of the fittings 12 and 13. At their lower ends, the fittings 12 and 13 receive the opposite straight ends of the coiled tubing 11. The split compression nipples 159A, 159B permit adjustment of the extent to which the straight ends of tubing 11 extend into the fittings 12, 13 for precisely setting the distance between the diaphragms of the transducers as measured through the gas column.

By way of example, the distance may be 11 feet so that the pulse travel time for a gas having a molecular weight of 29 will be 10 milliseconds at a $Cp/Cv$ of 1.4 and a temperature of 60° F. The flow meter 9, which may be of the type sold under the name "Rotameter," is attached to the mounting legs 151 of the unit 14 with its outlet connected by pipe 160 to the fitting 12 near the upper end thereof. The valve 15 for setting the rate at which the gas sample may flow through the analyzer column is incorporated in the flow meter near the inlet pipe connection 161. The stream of sample gas flows from the outlet connection in fitting 13 near the upper end thereof.

The shielded cables 128, 129 which respectively connect the driver and detector units 16, 17 to the pulse generator 25 and the pulse amplifier 38 extend from the housing 150 to the remotely located housing 170 (FIGS. 5, 8) which encloses the chassis 171 on which are mounted all of the components of pulse generator 25 and pulse amplifier 38 as well as the power supply 40 and amplifier 29. In FIG. 8, the visible components are identified by the same reference characters used in the schematic circuitry of FIGS. 2A, 2B. The mounting plate 172 (FIGS. 5, 6, 7, 9, 10) within the same instrument housing 170 supports the rest of the electrical, mechanical, optical and electromechanical components of the analyzer system.

Referring to FIGS. 5, 7 and 10, the rebalancing motor 28 is supported by spacers 178 from the rear face of the mounting plate 173 of the dual-speed unit 174 with its output shaft 175 coupled to shaft 176 of unit 174. A driving connection between these two shafts is effected by the coupling 177. The dual-speed unit 174 is in turn mounted from the rear face of the main mounting plate 172 by the spacers 179 with the opposite end of shaft 176 supported by bearing 180 in plate 172.

The drive pulley 181 for cord 31 is free to rotate with respect to the shaft 176 on which it is supported. The elongated hub of pulley 181 has peripherally spaced holes which receive three ball bearings 182 (FIG. 10) and permits them to engage the reduced diameter section of shaft 176. The outer race for the ball bearings is formed by the two rings 184, 185 whose inner faces are complementarily beveled for tangential engagement with the balls 182. The left-hand ring 184 frictionally engages the stationary plate 173. The coupling 177 has a stop pin for engagement with a stop pin carried by the hub of pulley 181. The springs 186, encircling the studs 187 which pass freely through the outer ring 185, determine the pressure forcing the balls 182 radially against shaft 176. This pressure may be varied by adjustment of the collars 188 along the studs.

Within the limits of one revolution of shaft 176 in either direction, i.e., with the coupling and hub stops out of engagement with each other, the balls 182 are rotated about their own respective axes by shaft 176 and, since the ball-race is held stationary by its frictional engagement with plate 173, produce a thrust causing the hub 181 to move in the same direction as shaft 176 but at reduced speed depending upon the relative diameters of shaft 176 and of the ball-race at the points of their engagement with the balls: for example, with a speed-reduction of about 5 to 1 for the construction shown in FIG. 10. At the limit of about one revolution of shaft 176 in either direction, the stop pin 208 on coupling 177 engages the stop 209 on the pulley hub so that for further movement of shaft 176 the pulley 181 turns in unison therewith instead of at reduced speed. In consequence, for a large mismatch of the time intervals respectively corresponding with the sonic pulse travel time and the beam sweep time, the photocell arm 30, as driven by pulley 181 through cord 31, is moved rapidly at the 1 to 1 speed ratio to the balance point and any overshoot is corrected slowly because of the speed-reduction introduced for corresponding reverse rotation of shaft 176. Conversely, for small changes in gas molecular weight, or other variable, the photocell arm 30 is adjusted slowly, i.e., at ⅕ speed, in avoidance of hunting or overshooting of the new matching point.

The motion of pulley 181 of unit 174 is transmitted via cord 31 to the supporting arm 30 for the photocell 24 which is enclosed in its slotted light shield 189. One end of the cord is attached directly to arm 30 and the other end is attached to arm 30 through the spring 190 (FIG. 7). The three idler pulleys 191 for guiding the cord 31 are rotatable about fixed axes provided by stud shafts extending from the rear face of the main mounting plate 172. The guide pulley 192 is rotatably mounted on the photocell arm 30. The pivoted arm 194 is attached to pen shaft 195 extending through the mounting plate 172. The free end of arm 194 is coupled by link 196 to one arm of lever 197 which is pivoted at 198 to the rear face of mounting plate 172. The opposite arm of lever 197 is shaped to form a cam 199 which engages the cam follower pin 200 on the photocell arm 30. The cam 199 is biased continuously to maintain such engagement by the spring 203 (FIG. 7) connected between lever 197 and the pivoted takeup arm 204 which carries the idler pulley 205 for the cord 31.

Thus, the photocell arm 30 is driven, through cord 31, to the matching point indicated by the position of its pointer 32 with respect to scale 33 and the recorder stylus arm 34 attached to shaft 195 is correspondingly moved with respect to the scale of chart 35A (FIG. 6) through the linkage including pin 200 on arm 30, cam 199 of arm 197 and link 196.

The mirror-drive motor 22 (FIGS. 5, 7 and 9) and its associated speed reducer 210 are mounted from the rear face of the main panels 172 by the spacers 211. The output shaft 212 of speed-reducer 210 receives the mirror shaft 213 and is clamped to it by the set screw 217. The mirror shaft 213 extends through the bushing or bearing 214 in panel 172. The lower end of the photocell arm 30 is freely pivoted upon bushing 214 behind the panel 172. The outer exposed end of shaft 213 is cut away to provide a mounting surface for the mirror 19 which in the particular apparatus described rotates at a constant speed of 450 r.p.m.

The scale 33 associated with the indicator 32 on photocell arm 30 is mounted on the front face of plate 172 (FIG. 6) with its zero graduation in alignment with the aperture 26 in the light shield 216 (FIG. 6) of the fixed photocell 27 and along a radial line thereto from the axis of rotation of mirror 19.

The small housing 220 (FIGS. 5, 6) mounted on the front face of panel 172 serves as a shield for the light source or lamp 20. The tube 221 in which the focusing lens 21 is mounted extends from the housing 220 toward the mirror 19 and is axially adjustable for focusing of the image of the lamp filament at the photocell shield apertures 23 and 26. The step-down transformer 222 (FIGS. 2B, 7) for exciting lamp 20 from the power line 37 is mounted on the rear face of panel 172.

The chart drive motor 36 (FIGS. 5, 7) is mounted from the rear face of the main plate 172 with the output shaft 225 of its associated speed-reducing gear train 226 extending through and substantially beyond the front face of panel 172. The free end of shaft 225 is provided with suitable means for removably clamping a round recorder chart 35A to the shaft. The stationary backing plate 236 for the recorder chart is mounted from the front face of the main mounting plate 172 by the posts or standoff spacers 227.

Both the recorder chart 35A and the indicator scale 33 are visible through a window in the front door 230 which is hinged at its left-hand edge to the instrument casing 170. This door, when opened, permits the chart 35A to be replaced and also permits the mounting plate 172 to be swung outwardly about its hinges 231 for service access to the motors 22, 28, 36 and the associated mechanisms as well as to the chassis 171 for servicing of the electrical components of the amplifiers. The stops 232 within the housing 170 engage the mounting plate 172 to define its proper innermost position.

What is claimed is:
1. A method for producing an accurate and variable interval of lapsed time related to sound velocity in a gas which comprises repeatedly scanning two angularly-spaced light-sensitive devices by a beam of light rotated at constant angular velocity, converting first electrical pulses incident to scanning of one of said devices to sonic pulses, applying said sonic pulses at one point to the gas, converting said sonic pulses to second electrical pulses upon arrival of said sonic pulses at another point in the gas, and varying the angle between said devices in sense dependent upon whether said second electrical pulses occur before or after the scanning of the other of said devices to match the time interval between the corresponding pairs of first and second pulses with the time required for the sonic pulses to traverse the gas between said points.

2. A method of determining quantities from which the molecular weight of a gas may be determined which comprises rotating a beam of light at constant angular velocity repeatedly to scan two angularly-spaced light-sensitive devices, converting first electrical pulses produced upon scanning of one of said devices to sonic pulses, applying said sonic pulses at a point in a column of said gas, converting said sonic pulses to second electrical pulses upon arrival of the sonic pulses at a second point in said column of gas, and varying the angle between said devices in sense dependent upon whether said second electrical pulses occur before or after scanning of the other of said devices to match said angle with the time required for the sonic pulses to traverse the distance between said points in the gas column.

3. A method of determining the time-interval required for sonic pulses to traverse an unknown distance between two points spaced in a gas which comprises rotating a beam of light at constant angular velocity repeatedly to scan two angularly-spaced light-sensitive devices, converting first electrical pulses, produced by one of said devices upon scanning of said one device, to sonic pulses applied to the gas at one of said points, producing second electrical pulses upon arrival of said sonic pulses at the other of said points, and increasing or decreasing respectively the angle between said devices in dependence upon whether said second electrical pulses occur after or before the scanning of the other of said devices to match the time interval between said first and second pulses with the time required for the sonic pulses to traverse the gas path between said spaced points.

4. A method of determining the level of liquid in a closed container having gas above said liquid which comprises rotating a beam of light at constant angular velocity repeatedly to scan two light-sensitive devices, converting electrical pulses, produced by one of said devices upon scanning of said one device, to sonic pulses, applying the sonic pulses to the gas at a first fixed point, detecting said pulses as reflected by the surface of the liquid to a second fixed point in the gas, and varying the angle between said devices in sense dependent upon whether said second electrical pulses occur before or after scanning of the other of said devices to match said angle with the time interval required for the sonic pulses to traverse the gas path from said first point to the liquid surface and back to said second point.

5. A system for providing a variable time-interval related to sound velocity in a gas comprising
   a pair of electromechanical transducers at spaced points in a gas path, one of said transducers when excited by an electrical input pulse applying a sonic pulse to the gas at one of said points and the other of said transducers producing an electrical output pulse upon arrival of a sonic pulse at the other of said points,
   means for producing a light beam revolving at constant angular velocity,
   a pair of light-sensitive devices angularly spaced with respect to the axis of rotation of said beam, one of said devices having mounting means adjustable to vary the angle between said devices,
   means including one of said devices for producing an electrical input pulse for exciting said one of the transducers when said one of the devices is scanned by the light beam, and
   means including the other of said devices and utilizing the electrical output pulses of the other of said transducers for effecting adjustment of said mounting means in sense dependent upon whether said electrical output pulses occur before or after scanning of said one of said devices so to match the angular spacing of said devices with the time required for the sonic pulses to travel between said points in the gas path.

6. A system for providing an accurate and variable interval of lapsed time related to sound velocity in a gas comprising
    means for producing a light beam rotating at constant angular velocity,
    a pair of light-sensitive devices mounted for relative angular movement with respect to the axis of rotation of said beam,
    driver means for applying sonic pulses to a point in a gas path,
    means including one of said devices for providing an exciting pulse for said driver means when said one of the devices is scanned by the light beam,
    means including detector means at another point in said gas path for producing electrical output pulses upon arrival there of said sonic pulses,
    reversible driving means for adjusting the angle between said devices, and
    means including the other of said devices for controlling the sense of adjustment of said angle by said driving means in dependence upon whether said electrical output pulses occur before or after said other of the devices is scanned so to match said angle with the time required for said sonic pulses to travel between said points in the gas path.

7. A system as in claim 6 in which the first-named means comprises a mirror rotatable at constant speed about a fixed axis equidistant from said light-sensitive devices, a stationary light source displaced from said axis, and optical means for directing light from said source onto said mirror for reflection in a path sweeping said light-sensitive devices and for focusing it on said light-sensitive devices.

8. A system for providing an accurate and variable interval of lapsed time related to sound velocity in a gas comprising
    means for producing a light beam rotating at constant angular velocity,
    a pair of light-sensitive devices mounted for relative angular movement with respect to the axis of rotation of said beam,
    driver means for applying sonic pulses to a point in a gas path,
    means including one of said devices for providing an exciting pulse for said driver means when said one of the devices is scanned by the light beam,
    means including detector means at another point in said gas path for producing electrical output pulses upon arrival there of said sonic pulses,
    reversible driving means for adjusting the angle between said devices, and
    control means including the other of said devices for controlling the sense of adjustment of said angle by said driving means in dependence upon whether said electrical output pulses occur before or after said other of the devices is scanned so to match said angle with the time required for said sonic pulses to travel between said points in the gas path said reversible driving means comprising an A.C. motor having two windings, one of which is continuously energized from an A.C. source, said control means additionally including two controlled rectifiers whose common output circuit includes the other motor winding and whose respective output circuits include voltage sources of the same frequency as said A.C. source and respectively of leading and lagging phase, the input circuit of at least one of said rectifiers including fixed biasing means for providing that one only of said rectifiers is in conductive state when said electrical output pulses occur before scanning of said other of the devices and both of said input circuits including diodes which reverse the conductive states of said rectifiers when said electrical output pulses occur after scanning of said other of the devices and which effect equal conduction by said rectifiers when said electrical output pulses occur during scanning of the other of said devices.

9. A system for providing a variable time-interval related to sound velocity in a gas comprising
    a pair of electromechanical transducers at spaced points in a gas path, one of said transducers when excited by an electrical input pulse applying a sonic pulse to the gas at one of said points and the other of said transducers producing an electrical output pulse upon arrival of the sonic pulse at the other of said points,
    means for producing a light beam rotating at constant angular velocity,
    a pair of photoelectric devices angularly spaced with respect to the axis of rotation of said beam, one of said devices having angularly adjustable mounting means,
    means including one of said photoelectric devices for providing the exciting pulses for one of said transducers,
    means for producing a control signal when the electrical output pulses of the other of said transducers occur after or during scanning of the other of said photoelectric devices,
    a reversible motor mechanically coupled to said mounting means and having two windings, one of which is continuously energized from an A.C. source,
    means for energizing the other of said windings including two controlled rectifiers whose output circuits respectively include voltage sources of lagging and leading phase,
    means effective in absence of said control signal to bias one of said rectifiers to non-conductive state while the other of said rectifiers is in conductive state so to effect rotation of said motor in one direction, and
    means including diodes in the input circuits of said rectifiers and responsive to presence of said control signal to reverse the conductive states of said rectifiers when said output pulses occur after scanning of the other of said photoelectric devices so to reverse the direction of rotation of said motor and to effect equal conduction by said rectifiers when said output pulses occur during scanning of said other of the photoelectric devices to hold said motor at rest when the angle between said pair of photoelectric devices corresponds with the time interval required for transmission of said sonic pulses between said spaced points in the gas path.

10. A system as in claim 9 in which the reversible motor is coupled to said adjustable mounting means for one of the photoelectric devices by a dual-speed unit affording low and high speed adjustment of said mounting means in dependence upon the extent and sense of rotation of the motor.

References Cited by the Examiner
UNITED STATES PATENTS

| | | | |
|---|---|---|---|
| 1,977,875 | 10/1934 | Donaldson | 250—230 X |
| 2,047,974 | 7/1936 | Lehr et al. | 340—1 |
| 2,568,277 | 9/1951 | Eltroth | 73—24 |
| 2,837,655 | 6/1958 | Lang | 250—51.5 |
| 2,978,899 | 4/1961 | Kritz | 340—5 |
| 2,984,097 | 5/1961 | Kniazuk | 73—24 |
| 3,100,885 | 8/1963 | Welkowitz | 73—24 X |
| 3,110,009 | 11/1963 | Bolton et al. | 250—233 X |

RALRH G. NILSON, *Primary Examiner.*

S. ELBAUM, *Assistant Examiner.*